United States Patent [19]

Destree

[11] 4,327,703
[45] May 4, 1982

[54] METHOD OF PREPARING CONCRETE COLUMN FOR ATTACHMENT TO BEAM

[76] Inventor: Allen L. Destree, 5218 92nd SW., Everett, Wash. 98204

[21] Appl. No.: 119,983

[22] Filed: Feb. 8, 1980

Related U.S. Application Data

[63] Continuation-in-part of Ser. No. 82,954, Oct. 9, 1979, abandoned.

[51] Int. Cl.³ .............................................. B28D 1/00
[52] U.S. Cl. ........................................ 125/1; 29/426.4; 52/514; 52/741; 125/13 R; 125/23 R; 225/2; 405/256
[58] Field of Search .................. 52/741, 514; 405/256; 29/414, 426.4, 426.5; 125/13 R, 14, 23 R, 23 C, 20; 225/2

[56] References Cited

U.S. PATENT DOCUMENTS

| | | | |
|---|---|---|---|
| 3,293,952 | 12/1966 | Fairbanks | 125/20 |
| 3,722,497 | 3/1973 | Hiestand | 125/14 |
| 3,727,599 | 4/1973 | Sugiki | 125/23 R |
| 4,044,749 | 8/1977 | Bowen | 125/23 R |
| 4,124,015 | 11/1978 | Isaksson | 125/23 R |
| 4,144,867 | 3/1979 | Wachs | 125/14 |
| 4,180,047 | 12/1979 | Bertelson | 125/14 |
| 4,197,828 | 4/1980 | Schellhorn | 125/23 C |

*Primary Examiner*—Harold D. Whitehead
*Attorney, Agent, or Firm*—David L. Garrison; Randy A. Gregory

[57] ABSTRACT

A method of preparing the upper end of a concrete column containing elongated reinforcing elements for connection to a cast-in-place beam supported by the column. The method comprises the steps of determining the elevation at which the column is to engage the beam, severing the column a distance above said elevation, axially core drilling the column to said elevation, scoring the outside of the column at the elevation by use of an abrasive saw, crushing the shell of the column about the area previously core-drilled to fracture the concrete and free the elongated reinforcing elements, and finally bending the elongated reinforcing elements into a position in which they tie into the cast-in-place beam structure to be supported by the column.

5 Claims, 8 Drawing Figures

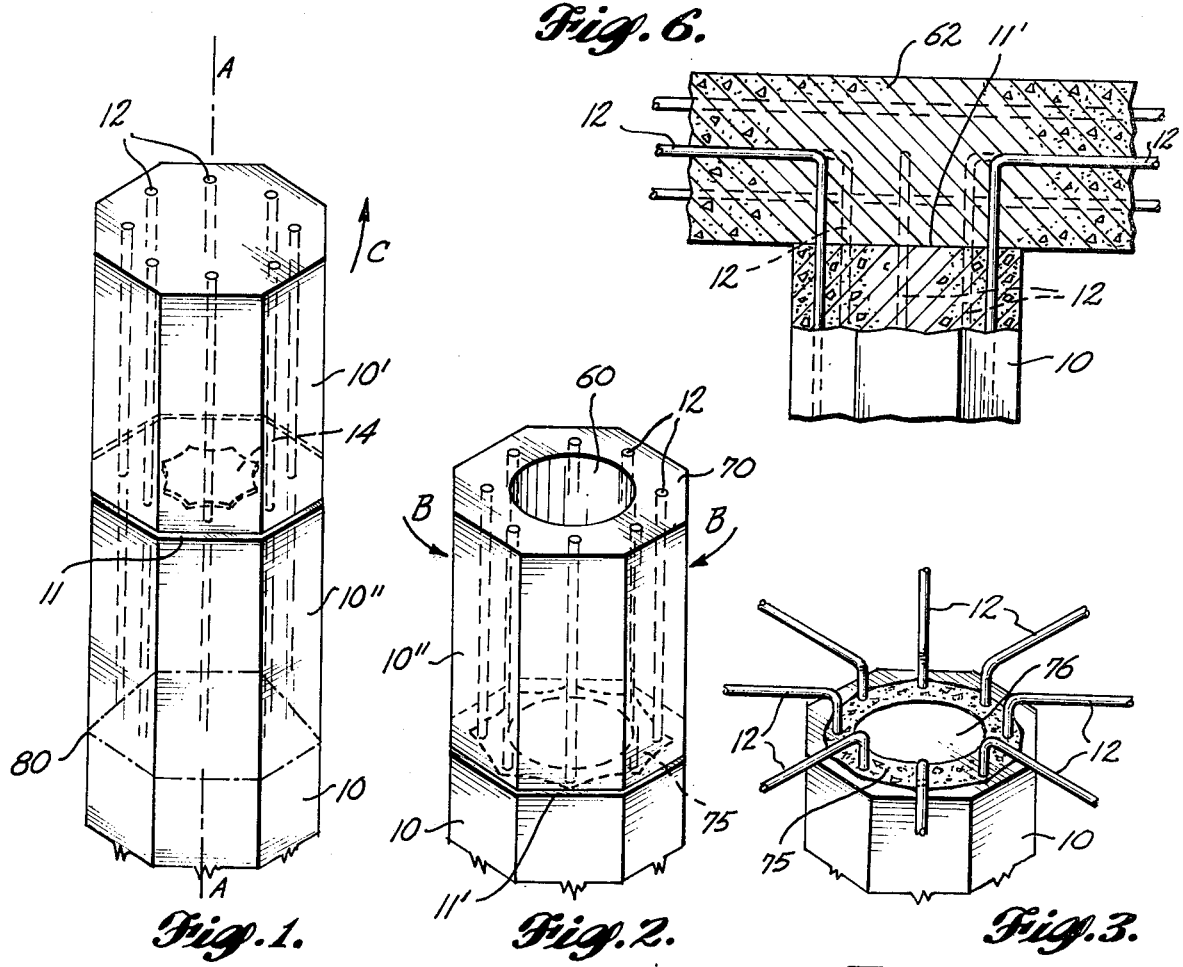
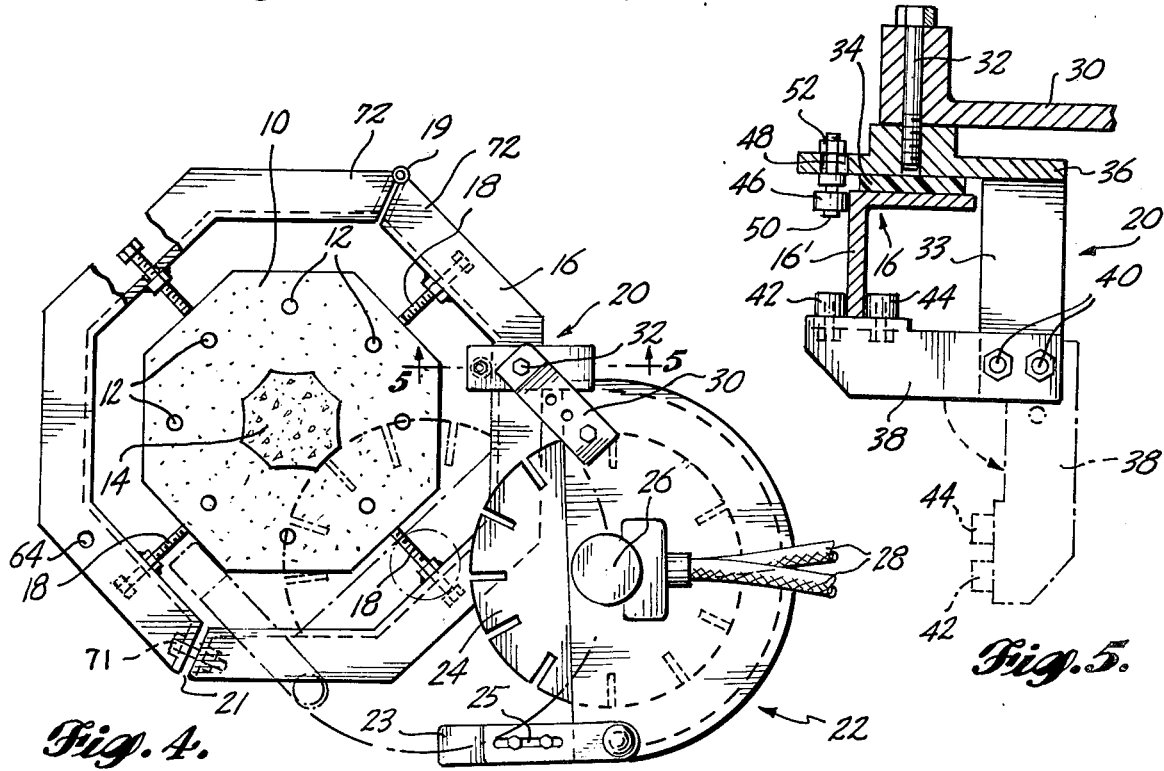

METHOD OF PREPARING CONCRETE COLUMN FOR ATTACHMENT TO BEAM

RELATED APPLICATIONS

This application is a continuation-in-part of my co-pending U.S. patent application, Ser. No. 82,954, filed Oct. 9, 1979, now abandoned.

BACKGROUND OF THE INVENTION

1. Field of the invention

This invention relates to manipulation of concrete columns and more particularly to a method of treating the end of a concrete column to ensure a secure engagement with a cast-in-place beam supported by the column.

2. Description of the prior art

Concrete columns and pilings are widely used in the construction industry for supporting a superjacent structure such as a cast-in-place beam for the construction of piers, buildings and other structures. Heretofore it has been necessary to establish the elevation of the beam to be supported and then remove, such as by use of a jackhammer or crushing device, the concrete forming the column above the elevation decided upon. The removal of the concrete by crushing or by use of a jackhammer frequently results in excessive spalling of the concrete in areas below that desired for the elevation of the beam or floor to be supported by the column. As a consequence, remedial or repair efforts are necessary to utilize the damaged column. In instances of severe spalling, building codes frequently require that the elevation of the beam to be attached to the column be set at the lower end of the spalled area. Accordingly, it is desirable to have a method of severing and preparing the column which minimizes or avoids the spalling damage encountered by the previous methods of preparation.

SUMMARY OF THE INVENTION

It is an object of this invention to provide an apparatus and method of severing and dressing the end of a reinforced concrete column.

It is a further object of this invention to provide a method of preparing an elongated concrete column to receive and tie into a cast-in-place beam or floor at a predetermined elevation.

These and other objects of this invention are accomplished by a method of preparation of one end of a reinforced concrete column in which the elevation of the finished column is first established and the column is cut at a location above that elevation sufficient to provide the length of reinforcing elements necessary to tie into the beam or floor which the column will support. An abrasive core drill of the type well known in the art is then utilized to bore an axially disposed hole extending inside the column to the elevation chosen above. An abrasive saw is then utilized to score the column at the predetermined elevation, the scoring extending into the column a substantial depth but insufficient to cut or otherwise damage the reinforcing elements imbedded in the column. The column is scored completely around its periphery to control and prevent any spalling of the concrete during the preparation steps which follow. The column above the predetermined elevation is thus a hollow column having reinforcing elements positioned in the annular portion of the column. The hollow cylindrical concrete portion of the column above the elevation chosen above is then crushed, such as by repeated sledgehammer blows or crushing in the jaws of a suitable crusher until the concrete is removed, exposing the reinforcing bars or cables. Due to the even score-cut at the elevation level and the bottom of the core-drilled area being even with the elevation line, the concrete will break out in an even fashion on the predetermined elevation. The exposed reinforcing elements are then bent down into a position in which they will be cast within the beam or floor to be supported by the column.

BRIEF DESCRIPTION OF THE DRAWINGS

FIG. 1 shows an octagonal column which has been partially severed at a fixed distance above an elevation plane.

FIG. 2 is a perspective view of the column shown in FIG. 1 wherein the upper portion thereof has been severed, removed and a core drill utilized to extend a hole axially into the column to the predetermined elevation, and a score line having been produced about the periphery of the column at the predetermined elevation.

FIG. 3 shows the column shown in FIG. 1 wherein the concrete has been removed from the portion of the column above the predetermined elevation and the reinforcing elements bent outwardly into a position to engage a floor or beam cast upon the column.

FIG. 4 is a plan view of an apparatus suitable for the steps of cutting and scoring the column.

FIG. 5 is a cross-sectional view of one portion of the device shown in FIG. 4.

FIG. 6 is a cross-sectional view of the concrete column with a crossbeam cast in place.

DESCRIPTION OF THE PREFERRED EMBODIMENT

Figure 7:
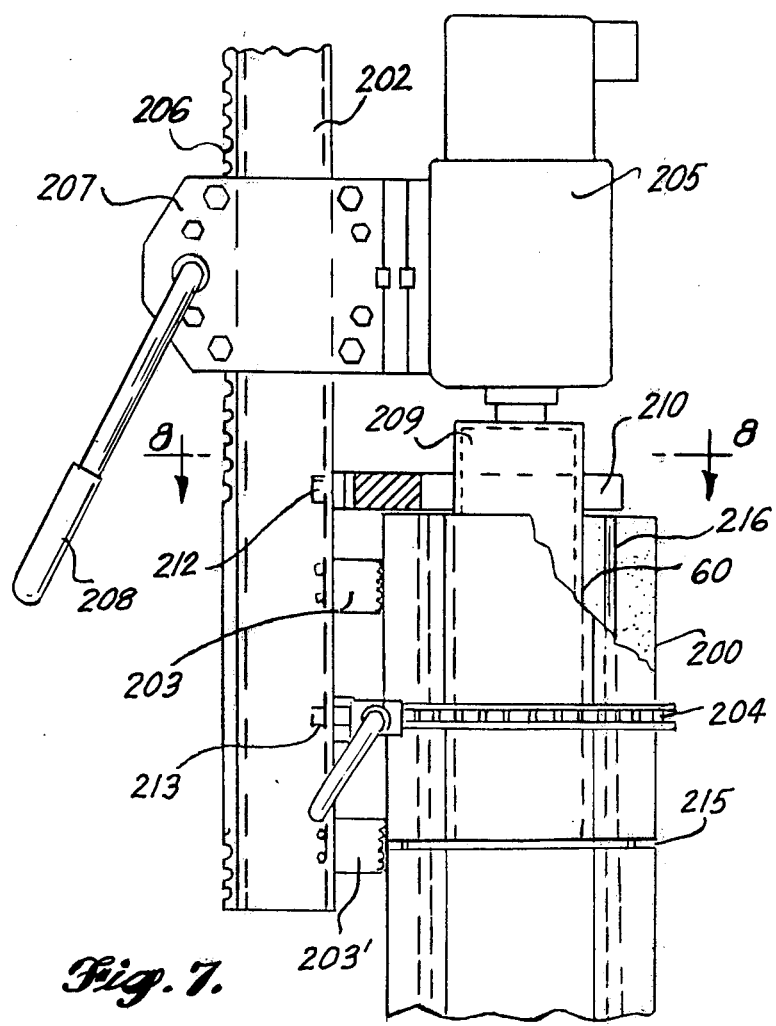
FIG. 7 is a side view, partly cross-sectional, of a drill mounting apparatus.

Referring specifically to the drawings wherein like figures indicate like parts, there is seen in FIG. 1 a perspective view of a column 10 in which a saw kerf 11 has been formed by the method and apparatus of this invention. The saw kerf 11 is shown having severed the reinforcing elements 12 and said kerf 11 extends inwardly from the periphery of column 10 to the uncut center 14. The upper portion 10' of the column is shown in FIG. 1 still supported by the uncut center 14. The central axis A—A of column 10 extends substantially through the middle of column 10 and passes through the uncut center 14. The elevation 80 is the level at which the column is to engage a cast-in-place beam 62, as is shown in FIG. 6.

FIG. 4 shows a track means 16 positioned immediately below the desired cutting plane of the column. Track means 16 is substantially octagonal in configuration and contains a plurality of standoff bolts 18 engaging the periphery of the octagonal column 10. These standoff bolts 18 serve to position the track 16 a distance away from the surface of column 10 and provide the support for track 16 to column 10. Track means 16 is made up of a plurality of segments of angle iron 72 welded together at the segment apices and hinged at hinge point 19, providing a pair of rigid track segments each being made up of four straight angle iron segments 72. The angle iron segments 72 are bolted together at apex 21 with fasteners 71. The fasteners 71 are drawn tightly together to securely engage standoff bolts 18 upon the surface of column 10 and fasten the track means 16 securely thereto. Track means 16 is positioned in a plane substantially perpendicular to the longitudinal axis of column 10.

Track means 16 is adjustable to columns of varying circumference by means of varying the length of insertion of standoff bolts 18 through the track means 16. However, when the standoff bolts 18 are inserted in their entire length through the track means 16 and this is insufficient to allow an adequate grip of column 10 by the standoff bolts 18, then a new track means 16 can be constructed of angle iron segments 72 which are shorter in length to provide a smaller circumference of track means 16 and adequate gripping of standoff bolts 18 to the column. The octagonal track means 16 can thus be made smaller or larger in circumference by varying the length of angle iron segments 72 and for each different track means, standoff bolts 18 will accommodate a certain range of column circumferences. As long as standoff bolts 18 can securely grip the column and as long as saw 22 can sever the column to the desired depth, virtually any configuration of track means can be used to guide track saw 22 about any shape of column. For instance, a octagonal track means such as that shown with track means 16 could be used to cut a circular or square column. However, the preferred embodiment for cutting a kerf such as 11' to a depth outside reinforcing elements 12, for the purposes of this process, is to have a track means that in its various segments is substantially equidistant from the column surface. This equidistance of the entire track means to the column will allow a more accurate use of saw gauge 23. For instance, to provide equidistance of a track means to a circular column a circular track means could be constructed. This circular track means could be hinged such as shown in 19, FIG. 4 and a pair of semicircular segments could be constructed of cut steel plate with a web such as shown in 16', also of cut steel plate, bent and welded to form a right-angle with the semicircular segment.

An abrasive saw, shown generally at 22 in FIG. 4, is pivotally attached to a carriage means 20 which is adapted to engage and ride upon track means 16. The carriage 20 shown in cross-section in FIG. 5 comprises an upper support bracket 36 which carries a wear pad 34 engaging the upper surface of track 16. Pad 34 is, for example, a low-friction polymer such as polytetrafluoroethylene, commonly sold under the trademark TEFLON, or equivalent polymer materials. Alternatively, a metal wear pad may be utilized. Also attached to the upper support bracket 36 is an upper guide roller 46 which is adjustably mounted in adjustment slot 48 of upper support bracket 36. Roller 46 may be adjusted to provide the proper angular orientation of the carriage 20 with respect to the track 16. Extending upwardly from the upper surface of upper support bracket 36 is saw pivot 32 which pivotally mounts saw arm 30. Web 33 extends downwardly from the upper bracket 36 and engages lower bracket 38 and fasteners 40. Fasteners 40 are readily removed to permit the entire saw support assembly to be dismounted from track 16 as shown by dotted lines in FIG. 5. The lower bracket 38 carries inner and outer guide rollers 42 and 44 respectively, which are adapted to travel along the lower web 16' of track means 16 as shown in FIG. 3. These guide rollers, capturing the web 16' of track means 16 as shown, prevent rotational movement of the carriage 20 about track means 16.

In FIG. 4 the saw 22 is shown carrying a depth gauge 23 which may be adjusted in slot 25 to set the depth at which saw 24 may penetrate column 10. The depth gauge 23 abuts a surface of column 10 and prevents further rotation radially inwardly of the saw 22.

In carrying out the method of this invention, the following sequence of steps is undertaken. A column to be cut and prepared for joining to a cast-in-place member is first marked for the location at which the column and member are to be joined. The column is then marked at a second elevation above the first mark, the second being such that the necessary length of reinforcing bars or cables will be exposed for proper joindure of the column to the cast-in-place member. A track means 16 is then assembled adjacent the second elevation and is positioned axially along the column 10 so that saw 24 when mounted upon the track 16 will cut a saw kerf 11 at the second elevation. The track 16 is opened about hinge point 19 and wrapped around the column 10 in the position as shown in FIG. 4. The fasteners 71 are then securely tightened to provide a firm engagement of the stand-off bolts 18 against the outer surface of column portion 10''. The saw carriage 20 is then assembled about track 16 as shown in FIGS. 4 and 5. The angular relationship between the track 16 and arm 30 may be adjusted, if necessary, by adjusting the relative position of upper guide roller 46. When carriage 20 is securely fastened upon track 16, the saw blade 24 is adjusted for proper depth of cut and started by applying hydraulic pressure through lines 28. When the saw blade 24 reaches its operating rotational speed, the saw 22 is pivoted toward column 10 until blade 24 engages and begins cutting the surface thereof. Saw 22 is then rotated inwardly until the desired portion of column 10 is cut along with reinforcing bars 12 to leave the central portion 14. The saw 22 is then rotated outwardly and moved along track 16 to another location whereat the saw is again rotated into column 10 causing a second cut. A saw kerf is thus formed about the periphery of the column 10 leaving the uncut center 14.

A second kerf 11' is then cut at the elevation 80, the elevation at which the column 10 is to engage the cast-in-place beam 62, and this elevation is substantially coplanar with the bottom of drilled aperture 60. The abrasive saw 22 is used to cut kerf 11' to a maximum depth without cutting or otherwise injuring the reinforcing elements 12. Saw 22 is set up on track means 16 and the depth gauge 23 is set for the desired depth of cut. Saw 22 is then rotated inwardly and the kerf 11' is cut. By moving the saw around track means 16 and repeatedly rotating saw blade 24 into cutting contact with column 10 the kerf 11' is extended around the entire periphery of column 10. This complete scoring at kerf 11' serves to control and prevent spalling of the concrete during the removal of the superjacent concrete described below.

After the saw kerfs 11 and 11' have been cut the column portion 10' must be removed. A cable is thus attached to portion 10' of column 10 and upon a side-directed moment the uncut center 14 fractures and the portion 10' can be removed from the upper end of column 10, as shown by C, FIG. 1. Alternatively a wedge can be driven into the saw kerf 11 to provide a sufficient force to fracture uncut center 14.

With the column portion 10' completely removed, the concrete in the remaining column portion 10'' must be removed to expose the upper portion of reinforcing elements 12. An axially disposed hole, or several holes, spaced within the inside of the reinforcing elements, are drilled by known procedures for drilling concrete to remove concrete from the center of column portion 10″. The drilling operation removes a substantial amount of the concrete from the interior of column portion 10″ leaving a shell of concrete containing reinforcing elements 12. An axially positioned hole 60 is cut extending from the top transverse surface 70 shown in FIG. 2 of column portion 10″ to the elevation 11′. Removal of the concrete inside the reinforcing members will permit the remaining hollow cylinder to be crushed and removed, exposing the reinforcing elements for use as described below.

The preferred method for removing the center portion of concrete from column segment 10″ is by core drilling. Core drilling removes concrete quickly and efficiently. An abrasive drilling means such as a diamond-impregnated drill can be used, the size being chosen to remove the maximum concrete possible without abrading or otherwise injuring the reinforcing elements 12. A suitable carriage for the hydraulic core drill devices is shown in my co-pending U.S. patent application, Ser. No. 952,916, filed Oct. 19, 1978, now issued as U.S. Pat. No. 4,234,155, which patent is incorporated herein by reference as if fully set forth. The tool stand disclosed therein may be attached to the track means 16 of this invention shown in FIG. 4 at aperture 64 by means of a bolt extending upwardly into the vertical column means of the tool stand. A suitable hydraulic or pneumatic core drill motor is securely attached to the movable carriage on the vertical column of the tool stand, so that the drill is positioned axially with respect to column segment 10″. An abrasive bit of appropriate size is used to extract a major portion of concrete from the center of the column portion 10″ which is inside the reinforcing elements 12. The drill bit is moved downwardly to cut out the desired portion by downward movement of the carriage until the drill bit reaches elevation 80 which is also the bottom of column portion 10″.

Figure 8:
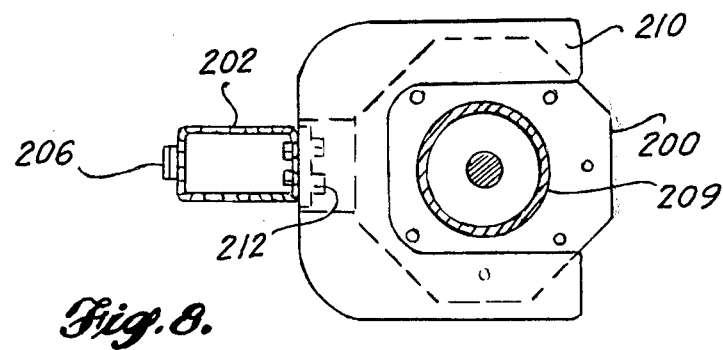
FIG. 8 is a top view, partially cross-sectional of the drill mounting collar of FIG. 7.

The drilled aperture 60 is preferably made by a core drill on a tool mount especially adapted for use in core drilling concrete columns such as that shown in FIGS. 7 and 8. The vertical column member 202, the rack 206 and the carriage means 207 for mounting the drill 205 are best shown in FIG. 7. My co-pending U.S. patent application Ser. No. 952,916, filed Oct. 19, 1978, now issued as U.S. Pat. No. 4,234,155, which patent is incorporated herein by reference as if fully set forth, also shows a suitable carriage. In this particular method for core drilling, the vertical column member 202 is mounted on the column portion 10″ with serrated gripping pads 203 and 203′ and a chain-type tightening mechanism 204. A U-shaped drill collar 210 steadies the drill mount while the core is being drilled. A bolt 213 fixes the chain-type tightening mechanism 204 to the vertical column member 202 and the bolts 212 fix the U-shaped drill collar 210 to the vertical column member 202. To make a drilled aperture 60 in a column portion 10″ the tightening mechanism 204 is first wrapped around the circumference of the column portion 10″ and tightened to bring the serrated gripping pads 203 into contact with the side of the column portion 10″ and the U-shaped collar 210 into contact with the top of the column portion 10″. When the tightening mechanism 204 has been sufficiently tightened, the operator handle 208 is rotated to move the carriage means and the attached drill means down into drilling engagement with the vertical column member 202. The drill means 205 and its abrasive bit 209 drill downwardly into the column portion 10″ until the elevation of the previously cut saw kerf 11″ is reached.

The drilled aperture 60 and kerf 11′ leave only a small uncut area 75 attaching column portion 10″ to column 10, including reinforcing elements 12 therein. FIG. 2 shows area 75 prior to crushing and removal of the remaining concrete of column portion 10″. The remaining concrete in column portion 10″ above the elevation at 11′ can be removed by blows from a sledgehammer or by suitable crushing jaws, as shown by B, FIG. 2. The kerf at 11′ maintains a clean line of cleavage when the concrete in 10″ is crushed. Reinforcing elements 12 are then cut to a desired length and bent to any desired angle for inclusion in a cast beam or floor, the elevation 80 being the elevation of the beam or floor to be supported by the column.

While the invention has been shown and described in relation to a specific preferred embodiment, it is to be understood that various modifications within the teachings herein are included within the scope of the appended claims.

I claim:

1. A method of preparing a concrete column having elongated reinforcing elements therein, for engagement with a superjacent cast-in-place concrete member comprising the steps of:

establishing an elevation for said superjacent cast-in-place concrete member;

severing said column at a predetermined distance above said elevation;

scoring the periphery of said column at said elevation to a depth insufficient to contact said elongated reinforcing elements but sufficient to prevent spalling of concrete from said column below said elevation;

removing concrete from the center of said column to said elevation, leaving a hollow column segment above said elevation; and crushing and removing the concrete in said column above said elevation to expose said reinforcing elements whereby said elements may be cast into said cast-in-place concrete member to form an interlocking bond between said column and said cast-in-place concrete member.

2. The method of claim 1 wherein said step of removing concrete from the center of said column is carried out by core drilling with a diamond impregnated rotary bit.

3. The method of claim 1 wherein said step of severing said column further comprises:

encircling said column with a track means, said track means supporting an abrasive saw means oriented with the blade thereof substantially perpendicular to the axis of said column, and rotating said saw means into cutting contact with said column at a plurality of locations around said column whereby said column is substantially severed.

4. The method of claim 1 wherein said step of removing concrete from the center of said column further comprises:

mounting tool stand means on said track means;

attaching a core drill means to said tool stand means, said core drill means positioned to drill said column axially; and drilling said column axially to said elevation.

5. The method of claim 1 wherein said step of removing concrete from the center of said column further comprises:

attaching tool stand means to said column with tightening collar means;

attaching a core drill means to said tool stand means, said core drill means positioned to drill column axially; and drilling said column axially to said elevation.

* * * * *

UNITED STATES PATENT AND TRADEMARK OFFICE
CERTIFICATE OF CORRECTION

PATENT NO. : 4,327,703
DATED : May 4, 1982
INVENTOR(S) : Allen L. Destree

It is certified that error appears in the above—identified patent and that said Letters Patent are hereby corrected as shown below:

At Column 6, line 27 through column 8, line 6, delete all the claims in their entirety and substitute the following:

1. A method of preparing a concrete column having elongated reinforcing elements therein, for engagement with a cast-in-place concrete member comprising the steps of:
   establishing a location along said column at which said column and said cast-in-place concrete member are to be joined;
   severing said column at a predetermined distance from said location;
   scoring the periphery of said column at said location to a depth insufficient to contact said elongated reinforcing elements but sufficient to prevent spalling of concrete from said column;
   removing concrete from the center of said column to said location, leaving a hollow column segment at the end of said column; and
   crushing and removing the concrete in said hollow column segment to expose said reinforcing elements whereby said elements may be cast into said cast-in-place concrete member to form an interlocking bond between said column and said cast-in-place concrete member.

2. The method of claim 1 wherein said step of removing concrete from the center of said column is carried out by core drilling with a diamond impregnated rotary bit.

3. The method of claim 1 wherein said step of severing said column further comprises:
   encircling said column with a track means, said track means supporting an abrasive saw means oriented with the blade thereof substantially perpendicular to the axis of said column; and

UNITED STATES PATENT AND TRADEMARK OFFICE
CERTIFICATE OF CORRECTION

PATENT NO. : 4,327,703
DATED : May 4, 1982
INVENTOR(S) : Allen L. Destree

It is certified that error appears in the above-identified patent and that said Letters Patent are hereby corrected as shown below:

rotating said saw means into cutting contact with said column at a plurality of positions around said column whereby said column is substantially severed.

4. The method of claim 1 wherein said step of removing concrete from the center of said column further comprises:
        encircling said column with a track means;
        mounting tool stand means on said track means;
        attaching a core drill means to said tool stand means, said core drill means positioned to drill said column axially; and
        drilling said column axially to said location.

5. The method of claim 1 wherein said step of removing concrete from the center of said column further comprises:
        attaching tool stand means to said column with tightening collar means;
        attaching a core drill means to said tool stand means, said core drill means positioned to drill column axially; and
        drilling said column axially to said location.

UNITED STATES PATENT AND TRADEMARK OFFICE
CERTIFICATE OF CORRECTION

PATENT NO. : 4,327,703

DATED : May 4, 1982

INVENTOR(S) : Allen L. Destree

It is certified that error appears in the above-identified patent and that said Letters Patent is hereby corrected as shown below:

6. The method of claim 1 wherein said column is vertically oriented for engagement with a superjacent cast-in-place concrete member.

On The Title Page, "5 Claims" should read -- 6 Claims --.

Signed and Sealed this

Twenty-sixth Day of October 1982

[SEAL]

Attest:

Attesting Officer

GERALD J. MOSSINGHOFF

Commissioner of Patents and Trademarks